(12) United States Patent
Kopel

(10) Patent No.: US 7,119,308 B2
(45) Date of Patent: Oct. 10, 2006

(54) FORCED-AIR HEATER CONTROL SYSTEM AND METHOD

(76) Inventor: Zev Kopel, 105 Silverbirch, Dollar-des-Ormeaus, Quebec (CA) H9A 2L4

( * ) Notice: Subject to any disclaimer, the term of this patent is extended or adjusted under 35 U.S.C. 154(b) by 0 days.

(21) Appl. No.: 11/229,283

(22) Filed: Sep. 16, 2005

(65) Prior Publication Data

US 2006/0006167 A1    Jan. 12, 2006

Related U.S. Application Data

(63) Continuation of application No. 10/721,732, filed on Nov. 25, 2003.

(51) Int. Cl.
*H05B 1/02* (2006.01)

(52) U.S. Cl. .................. 219/494; 219/497; 219/501; 392/360; 392/373; 374/112

(58) Field of Classification Search ............ 219/497, 219/499, 483–486, 506, 501; 392/360–374, 392/379–388; 307/38–41; 374/102, 120, 374/121, 112
See application file for complete search history.

(56) References Cited

U.S. PATENT DOCUMENTS

| | | | |
|---|---|---|---|
| 1,946,262 A | 2/1934 | Adams | 210/39 |
| 2,647,401 A | 8/1953 | Hathaway | 73/204 |
| 3,553,431 A | 1/1971 | Petersen | 219/505 |
| 3,560,710 A | 2/1971 | Fuellemann | 219/373 |
| 3,594,546 A | 7/1971 | Smillie | 219/501 |
| 3,641,312 A | 2/1972 | Ammerman et al. | 219/532 |
| 3,674,203 A | 7/1972 | McGrath | 236/38 |
| 3,737,622 A | 6/1973 | Hallgreen | 219/364 |
| 4,304,127 A | 12/1981 | Feller | 73/193 |
| 4,314,143 A | 2/1982 | Bilstad et al. | 219/497 |
| 4,523,081 A | 6/1985 | Geib, Sr. et al. | 219/370 |
| 4,595,139 A | 6/1986 | Levine | 236/44 |
| 4,607,787 A | 8/1986 | Rogers | 236/11 |
| 4,641,013 A | 2/1987 | Dunnigan et al. | 219/364 |
| 4,642,441 A | 2/1987 | Kenyon | 219/364 |
| 4,706,736 A * | 11/1987 | Gyori | 165/206 |
| 4,782,708 A | 11/1988 | Harrington et al. | 73/861.05 |
| 4,821,700 A | 4/1989 | Weibler et al. | 123/494 |
| 4,886,110 A | 12/1989 | Jackson | 165/22 |
| 4,913,223 A * | 4/1990 | Mizuno et al. | 165/61 |
| 4,966,037 A | 10/1990 | Sumner et al. | 74/204.26 |

(Continued)

OTHER PUBLICATIONS

University of Cambridge, Whittle Laboratory, Department of Engineering, "Hot-Wire Anemometers," by Howard Hodson and Robert Howell, Oct. 1, 2003.

(Continued)

*Primary Examiner*—Mark Paschall

(57) ABSTRACT

The present invention relates to a forced-air electric heater control system for HVAC systems. One embodiment utilizes two heat sensors which are positioned upstream and downstream, equidistant from the heating element(s). The control system, in this embodiment, takes the difference between the temperature signals, thereby eliminating any radiant heat factor, and the resulting signal is used to control the heater. In other embodiments, the method senses upstream and downstream temperatures, determines air velocity in the duct, determines the amount kilowatts (KW) or other heat per unit time or power based thereon, and enables the power control switch when the resultant is less than a predetermined value. Alternate systems initially test for air velocity by application of nominal power, and then use the measured velocity and the downstream temperature to obtain a control signal for the heater. A pressure differential may be used. The systems compensate for radiant heat factor.

16 Claims, 5 Drawing Sheets

U.S. PATENT DOCUMENTS

| | | | |
|---|---|---|---|
| 5,050,533 A | 9/1991 | Zaber | 118/667 |
| 5,111,527 A | 5/1992 | Arold et al. | 392/360 |
| 5,214,740 A | 5/1993 | Carroll | 392/481 |
| 5,652,826 A | 7/1997 | Mills | 392/376 |
| 5,805,767 A | 9/1998 | Jouas et al. | 392/373 |
| 5,836,693 A | 11/1998 | Stulen et al. | 374/45 |
| 5,925,321 A | 7/1999 | Koyamoto et al. | 422/122 |
| 6,058,774 A | 5/2000 | Rengshausen | 73/204.24 |
| 6,176,306 B1 | 1/2001 | Galt | 165/240 |
| 6,431,457 B1 | 8/2002 | Dirkes | 236/11 |
| 6,440,157 B1 | 8/2002 | Shigezawa et al. | 607/96 |
| 6,665,492 B1 | 12/2003 | Garcia et al. | 392/383 |
| 2004/0173346 A1 | 9/2004 | Byrnes et al. | 165/253 |

OTHER PUBLICATIONS

Flometrics—Hot Wire Calibration and Measurement System, Oct. 1, 2003.

* cited by examiner

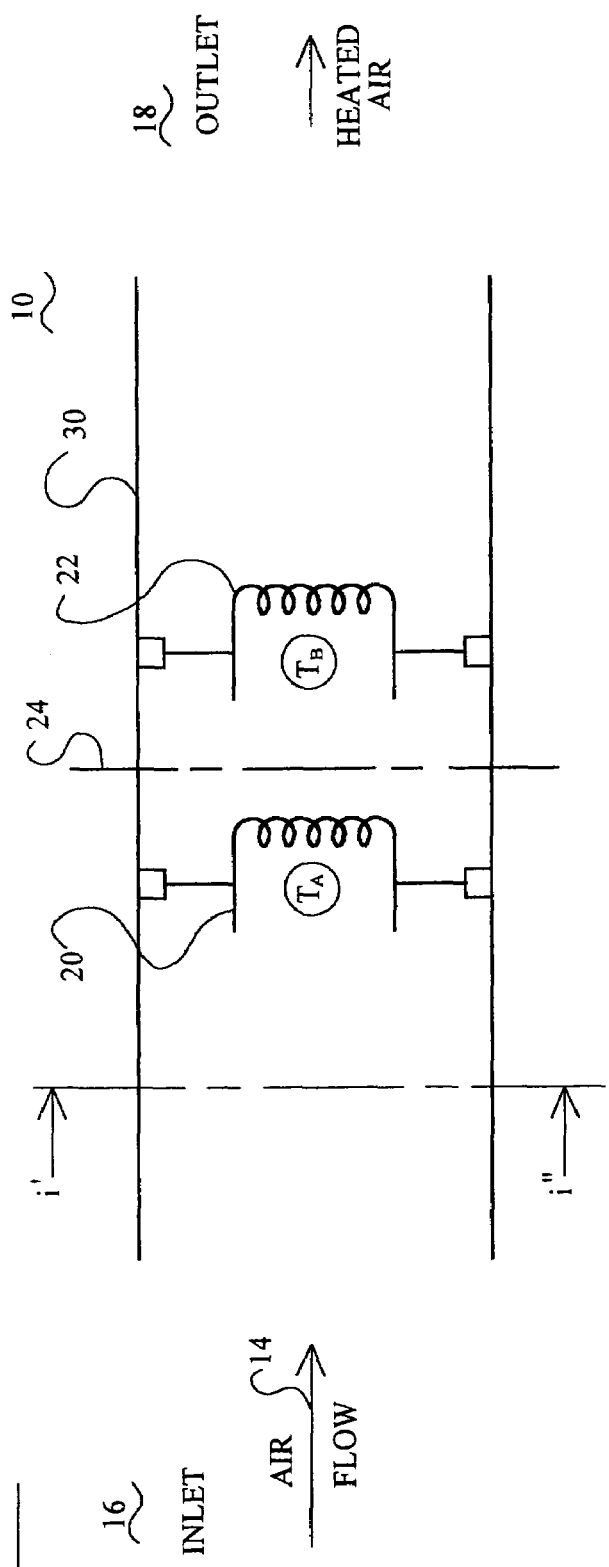
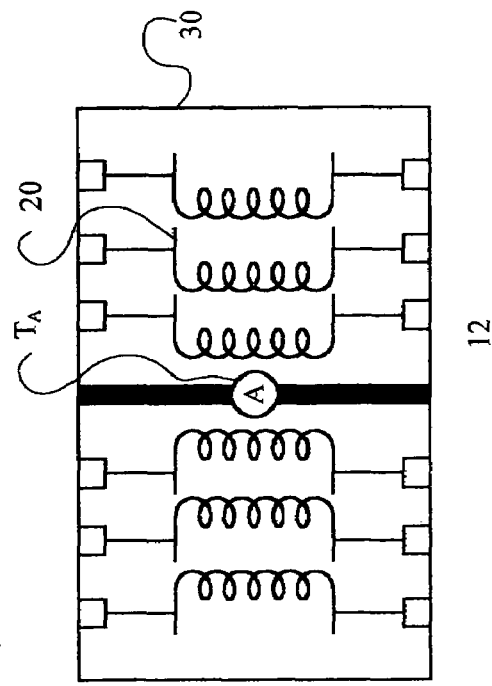
FIG.1
FIG.2

FORCED-AIR HEATER CONTROL SYSTEM AND METHOD

The present application claims the benefit of and is a continuation of patent application Ser. No. 10/721,732 filed Nov. 25, 2003, now pending. The present invention relates to a heater control system utilized to control the operation of electric heaters in a forced-air duct system.

BACKGROUND OF THE INVENTION

Electric heating elements are commonly used in Heating, Ventilating and Air-Conditioning systems (HVAC). They are commonly used in the primary duct system to heat air being re-circulated within the conditioned air space and HVAC system, and also to heat air being brought into the conditioned space from the outside ambient air via a fresh-air intake or duct. Numerous control systems have been utilized to detect and energize the heating elements when the air being circulated into or through the HVAC system requires heating. For example, U.S. Pat. No. 6,176,306 to Gault discloses a method and a device for controlling the operation of a heat pump. The Gault heat pump control includes an upstream temperature sensor and a downstream temperature sensor mounted on opposite sides of the heating, refrigerant coil. However, the downstream temperature sensor is still upstream of the auxiliary heating unit (an electrical resistance heater). The thermistors T1 and T2 (which correspond to the sensors) sense the temperature on both sides of the heating, refrigerant coil and the operational amplifier calculates the difference. That difference is adjustable to establish the set point by means of variable resistors. If the temperature difference on either side of the coil is below a predetermined threshold, a relay is energized causing the auxiliary heater to turn on. Gault '306 does not show the temperature sensors at equidistant positions on either side, upstream and downstream, from the electric heating element.

U.S. Pat. No. 4,607,787 to Rogers discloses an electronic control and method for increasing efficiency of heating in an HVAC system. Rogers shows, in FIG. 2, temperature sensors upstream and downstream of the HVAC unit. These temperature sensors are utilized to control the HVAC system to make operation more efficient. For heating, the program cycles the HVAC's burner "on" until the temperature differential between the supply and return ducts reaches a first percentage (e.g., 85%) of the rise in a preset period of time (e.g., 5 minutes) as recorded previously during monitoring, and "off" until the temperature differential between the supply and return ducts reaches a second percentage (e.g., 60%), lower than the aforementioned first percentage of the rise. Rogers '787 does not discuss positioning the sensors equidistant away from a heating element.

OBJECTS OF THE INVENTION

It is an object of the present invention is to provide a forced-air heater control system for an electric heater in an HVAC system that utilizes two temperature sensors located equidistant from at least one heating element such that the system is enabled based upon a difference between the two sensor signals resulting in a signal representing the convection heat which is absorbed by the forced air as is traverses the electric heater.

It is a further object of the present invention to provide a forced-air heater control system for an electric heater in an HVAC system that senses the ambient and radiant heat upstream of the heating elements, senses the ambient, radiant and convection heat downstream of the heating element, takes a difference between the two, resulting in a net sensory component, and utilizes that net component to determine whether to increase the number of times the heater element is energized in a given period of time depending upon predetermined thresholds.

It is another object of the present invention to provide a method for controlling the operation of electric heaters in an HVAC system utilizing a difference in the heat measured equidistantly upstream and downstream of at least one heating element disposed in a forced-air duct.

It is an additional object of the present invention to control a heating element based upon air velocity and sensed upstream and downstream temperatures, in one embodiment, and air velocity and sensed upstream temperatures in another embodiment (the downstream temperature being fixed), wherein the radiant energy component of the sensed temperature signal is eliminated with an ambient-compensated active temperature sensor (an active temperature sensor (such as an RTD) compensated by a passive temperature sensor.

It is a further object of the present invention to detect air velocity via a hot wire velocity control unit and formula or a differential pressure sensing sub-system, wherein the radiant energy component of the sensed temperature signal is eliminated.

It is an object of this invention to generate the maximum permitted production of heat from the duct heater under variable conditions of both ambient or input air temperature and variable air velocity in the duct.

SUMMARY OF THE INVENTION

The present invention relates to a forced-air heater control system for an electric heater suitable for HVAC systems. The heater control system utilizes two heat sensors, typically thermistors, which are positioned upstream and downstream, equidistant from and on either side of an electric heating element(s) in order to sense the heat both upstream and downstream of the heating element(s). The control system obtains a signal representing the difference between the heat sensed downstream and upstream of the heating elements. This difference-signal substantially represents the convection heat present in the air downstream of the heating elements. A control circuit, be it a digital or analog circuit, utilizes the difference-signal to enable and disable the electric heaters based upon a predetermined threshold value. The control system may also use the heat sensors to override and disable the heater in the event either sensor senses a predetermined high value.

The forced-air heater control system of the present invention is for an electric heater having at least one electric heating element disposed within an air duct carrying forced air from an upstream position to a downstream position. The electric heating elements are typically supplied with electrical power via a power control switch. The control system includes a first thermistor and second thermistor disposed upstream and downstream of, and spaced equidistant from, the heating element, respectively. Each thermistor produces an output which is inputted into a control signal generator. The control signal generator compares the inputted thermistor outputs and generates a power ON output signal to the power control switch when the difference between the thermistor outputs is below a predetermined value. The control system may also include an override input into the control signal generator such that if either of the thermistor outputs reaches a maximum threshold value (maximum temperature value), the control signal generator disables the output or otherwise generates a power OFF signal to the power control switch.

The thermistors or heat sensors are spaced apart from the heating element(s) such that each of the thermistors is capable of sensing the radiant heat from the heating element. The control signal generator may be constructed as an analog circuit or as a digital circuit. The control signal generator may also include a pulse width modulated signal generator to generate the power ON signal which is output to the power control switch. This pulse width modulated signal may also be generated viz-a-viz an analog circuit or a microprocessor/synthesizer. By utilizing a pulse width modulated output signal the control system may be customized to turn ON or OFF the heaters for specific intervals of time, depending upon the system conditions.

The present invention also relates to a method of controlling a forced-air heater system having at least one heating element disposed within an air duct carrying forced air from an upstream position to a downstream position. The method includes sensing the heat in the air duct at equidistant upstream and downstream locations relative to the electric heating element, comparing the heat sensed at the equidistant upstream and downstream locations to obtain a difference, and enabling a power control switch to supply electrical power to the heating element when the difference is below a predetermined value. The method may also include comparing the heat sensed at the equidistant upstream and downstream locations to a maximum threshold value, respectively, and disabling the power control switch if either of the sensed heat signals exceeds the value.

In another embodiment, the control method senses upstream and downstream temperatures, determines air velocity in the duct, determines the amount of kilowatts (KW) (or other heat per unit time or power) for the heater element(s), based on the upstream and downstream temperatures and air velocity, and enables the power control switch ON the electric heater when the resultant (KW) is less than a predetermined value. The power control switch applies a pulse width modulated signal to the electric heater(s). In a further enhancement, the control system detects which sensors are upstream as compared with downstream of the electric heater by monitoring the temperature difference between the sensors and designating one of the temperature sensors as the "upstream" sensor. In a further development, the downstream temperature can be fixed at a maximum level (TempDownFixed) thereby obviating the need to continually monitor the downstream temperature. Air velocity can be determined with a thermal anemometric sensor (e.g., a hot wire temperature sensor) or by obtaining the pressure differential based upon the total pressure and the static pressure in the HVAC duct. When the downstream temperature is fixed at a preset value, the upstream temperature has no minimum or maximum value. In a preferred embodiment, a passive temperature sensor is mounted proximate to an active temperature sensor (thermal anemometric or RTD sensor), on one side of the heating element(s) and a passive sensor is placed on the opposite side of the heating element(s). The active temperature sensor can be utilized to detect air velocity and since both the active sensor and the passive sensor are proximate each other, the distance away from the electric heater is the same, and the radiant heat component directed to each sensor is discounted or compensated for in the determination of the air velocity. The radiant heat from a heating element is the same as long as the distance from the sensor to the heating element is the same. In all control systems, the sensors must be directly effected by radiant heat developed by the heating element. In a further improvement, the signals from the temperature sensors are compensated by removing a radiant heat factor which is based upon the kilowatts generated by the heating element and the distance of the sensor away from the heating element.

The currently preferred embodiment of the invention controls the heater by sensing the upstream and a downstream temperature, determining an air velocity through said air duct based upon said upstream and downstream temperatures by initially applying a nominal KW power to the heater elements, measuring the temperature and calculating air velocity VEL, determining an amount kilowatts (KW) or other heat per unit time or power based upon the measured velocity VEL and the upstream temperature and enabling said power control switch ON based upon the determined or calculated kilowatts (KW) or other heat per unit time or power. When a comparison of the downstream temperature and a set point temperature for the heater duct is beyond a predetermined range (monitored substantially continually), the velocity is re-calculated or re-determined using the actual kilowatts (KW) or other heat per unit time or power and the measured upstream and downstream temperatures. When the velocity falls to a nominal level, the controller turns OFF the heater element(s) but shifts into a "sleep" mode wherein the heating element is periodically powered with a nominal KW power ON the measure air velocity based on the nominal KW power and the two temperatures.

BRIEF DESCRIPTION OF THE DRAWINGS

Further objects and advantages of the present invention can be found in the detailed description of the preferred embodiments when taken in conjunction with the accompanying drawings in which:

FIG. 1 diagrammatically illustrates a side view of an air duct with an electric heater and part of the control system disposed within the duct (a single heater element may be used);

FIG. 2 diagrammatically illustrates a cross-sectional view of the air duct illustrated in FIG. 1 (the duct may be vertical, horizontal, or disposed in other positions);

DETAILED DESCRIPTION OF THE PREFERRED EMBODIMENTS

Figure 3:
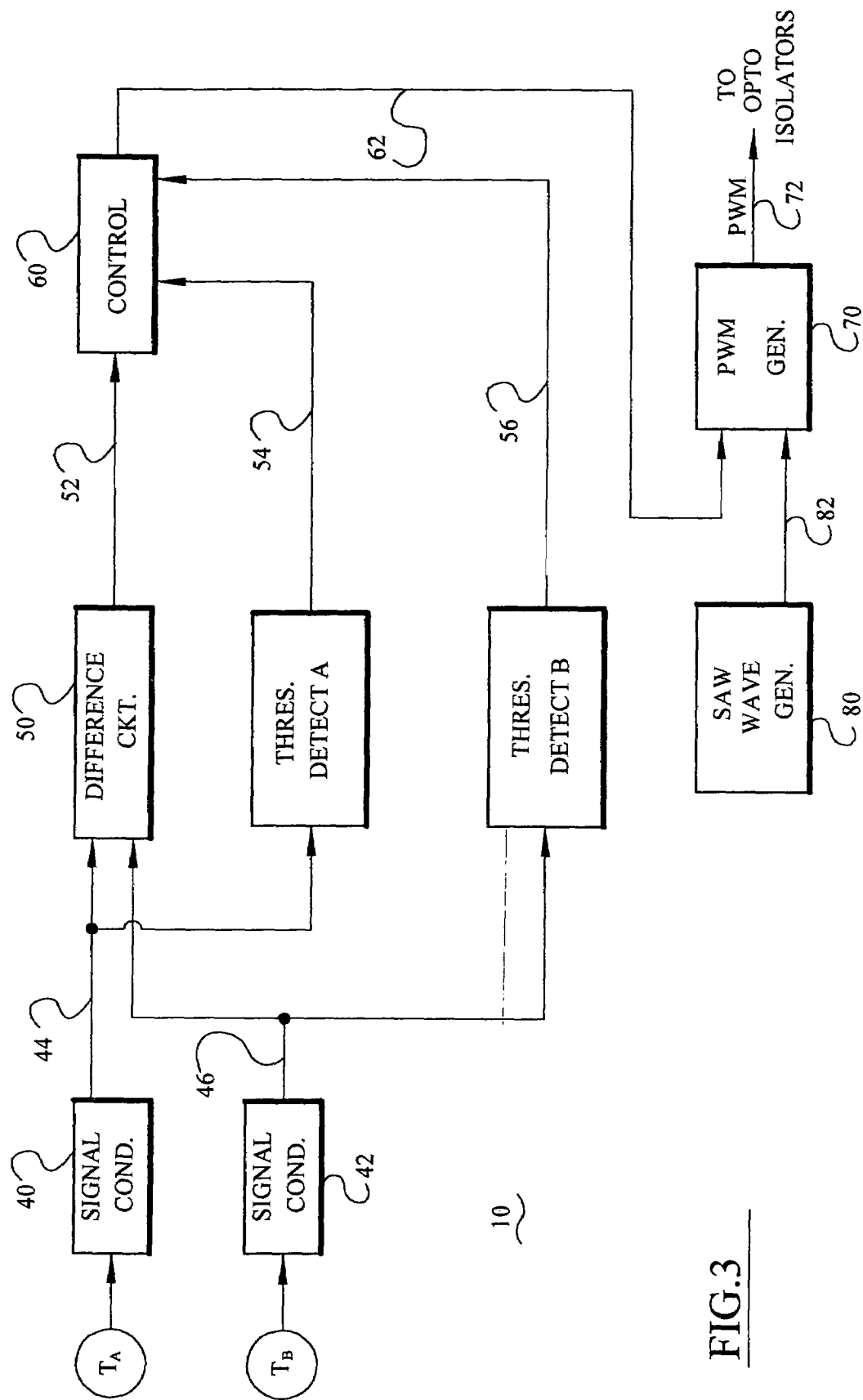
FIG. 3 diagrammatically illustrates a block diagram of part of the heater control system.

The present invention relates to a forced-air heater control system for an electric heater suitable for HVAC systems. FIG. 1 diagrammatically illustrates one embodiment of the heater control system sensors $T_A$, $T_B$ positioned within an HVAC duct 30. Alternatively, the sensors and heater(s) may be disposed in an electric duct heater (which electric duct heater is part of the HVAC duct system). All illustrations of the ducts represent both main and auxiliary heating ducts in HVAC systems. The heater control system 10 of the present invention is typically utilized in conjunction with an HVAC system. For example, many building codes require that HVAC systems utilized in a commercial setting have a fresh-air intake ducted directly into the air distribution system such that ambient air from outside the building is constantly being brought into the building space. Often times, the temperature of the ambient air is undesirably low for distribution throughout the building. Many HVAC systems use an inline electric heater to heat the fresh-air prior to introducing the air into the main duct system. The present invention provides a novel approach for measuring and controlling the heating of such air. HVAC systems may also include electric heating elements as primary or auxiliary heating devices to heat the air being circulated through the air-conditioning system. The present invention may be utilized to control the operation of such electric heaters as well. Similar reference numbers and letters represent similar components and system features throughout the drawings and the written description.

FIG. 1 illustrates an electric heater mounted within duct 30 (an HVAC duct or an electric duct heater) having two electric heating elements 20, 22 (preferably, elements 20, 22 have the same power but a single heater element may be employed). The heating control system 10 may be used in conjunction with any number of heating elements. Heat sensors $T_A$, $T_B$ are illustrated on either side of heating elements 20, 22. Heat sensors $T_A$, $T_B$, are typically thermistors. Other sensors which can provide an electrical signal based upon exposure to heat may also be used. The heat sensors $T_A$, $T_B$ are positioned upstream and downstream of the electric heating elements 20, 22, respectively. The terms upstream and downstream are used to designate location relative to airflow through the duct. Hence, as indicated by airflow arrow 14, thermistor $T_A$ is upstream of heating element 20 because the air travels downstream from inlet 16, through duct 30 and heating elements 20, 22, and out through outlet 18.

The heater control system 10 utilizes signals from thermistors $T_A$, $T_B$ to determine when to turn ON and OFF the electric heating elements 20, 22. In the preferred embodiment, heat sensors $T_A$, $T_B$ are positioned equidistant from the electric heating elements 20, 22, such that if no air was flowing through duct 30 and the heating elements were ON, each sensor would generate a substantially similar signal, representing the radiant heat given off by the heating elements on either side of the heating elements 20, 22 plus the ambient temperature of the air. The heat sensors $T_A$, $T_B$ are in close proximity to the heating element since the sensors are located typically on the body of the heater frame, such that they sense radiant heat. In the preferred embodiment the heat sensors are themistors which change electrical characteristics, such as resistance to electrical current, based upon exposure to heat energy.

During operation of the heating elements 20, 22, the space about sensor $T_A$ will be exposed to radiant heat given off by heating elements 20, 22, the ambient temperature of the incoming air and potentially a minute amount of light energy given off by the heating elements 20, 22. Heat sensor $T_B$, located downstream of the heating elements, in addition to the aforementioned energy sources, will also be exposed to the convection heat absorbed by the air as it traversed through the heating elements 20, 22. Hence, in the preferred embodiment, sensors $T_A$, $T_B$ are spaced equidistant from the heating elements 20, 22 such that, during operation of the heating elements, the difference between the feedback signals generated by the two sensors is substantially representative of the convection heat absorbed by the air.

The heating control system 10 of the present invention may be utilized with one or more heating elements configured in a number of ways. With regard to the placement of the heat sensors, $T_A$, $T_B$, one sensor is upstream and the other downstream of the heating element components or component such that each is exposed to a substantially equivalent magnitude of the radiant heat given off by such heating element components. Radiant heat is not affected by air flow through the system but convection heat is effected. For example, in the embodiment illustrated in FIG. 1, two heating elements 20, 22 are configured substantially lateral, with respect to a longitudinal aspect of duct 30. Reference line 24 represents an "energy" centerline from which sensors $T_A$, $T_B$ are equidistantly spaced apart such that the radiant heat given off by the adjacent heating elements 20, 22 during their operation is sensed by sensors $T_A$, $T_B$ substantially the same. The centerline is the imaginary "energy" center of the heating elements and the sensors are equidistant therefrom. If the heaters have the same power, line 24 is midway between the heaters. Even if a non-symmetrical configuration of heating elements is utilized, a person of ordinary skill in designing such systems may calculate an upstream and downstream location for the placement of heat sensors $T_A$, $T_B$, respectively, from the heater "centerline" or "center point" such that the sensors will be exposed to a substantially similar amount of radiant heat emanating from the grouped heater elements.

FIG. 2 diagrammatically illustrates a cross-sectional view of the duct 30, heating element 20, and heat sensor $T_A$ from the perspective of line i'–i" in FIG. 1. This view reveals that the heating element 20 includes six (6) vertical heat strip coils traversing a substantial part of the cross-sectional area of duct 30. Although duct 30 has a rectangular cross section in FIG. 2, the duct may have other cross sectional shapes as well (e.g., round or elliptical). In this embodiment, the position of sensor $T_A$ is diametrically opposite sensor $T_A$, $T_B$. The sensors are held by brace member 12.

FIG. 3 diagrammatically illustrates a block diagram of part of the heater control system 10. The signals generated by heat sensors $T_A$, $T_B$ are conditioned through respective signal conditioners 40, 42. The conditioned signal 44 from $T_A$ inputs into difference circuit block 50 and into threshold detector block A. Similarly, conditioned signal 46 from $T_B$ inputs into difference circuit block 50 and into threshold detector block B. The difference circuit block 50 utilizes the two inputs 44, 46 from $T_A$, $T_B$ and generates an output signal 52 representative of the difference between the two inputs. This difference-output signal 52 substantially represents the amount of convection heat sensed by downstream heat sensor $T_B$. In an alternative embodiment (discussed later), the signals from the upstream and downstream temperature sensors are reversible, that is, the system may operate with air flow in either direction.

Threshold detector blocks A and B produce output signals 54 and 56, respectively. Each of threshold detector blocks A and B produces a disable or OFF output signal if the conditioned signals 44, 46 from either $T_A$ or $T_B$, respectively, reaches a predetermined critical high value. This is a safety feature in that if either heat sensor $T_A$, $T_B$ produces a signal representing a threshold maximum heat level based upon heat sensed in their respective upstream and downstream zones, the system 10 disables the heating elements 20, 22. All signals discussed herein may be represented by high or low level signals. That is, the control system 10 may be designed such that a low signal output signifies an enable or ON condition, and vice-versa.

The difference-signal 52, and the two threshold detector outputs 54, 56 all input into control circuit 60. Control 60, whether embodied digitally or analog, functions as a gate, switch or comparator. If either threshold detector output signals 54 or 56 produces a disable signal output, then controller 60 disables any enabling output signal 52 that may be output from difference circuit 50. The control circuit output 62 of controller 60 is electrically coupled to pulse width modulator (PWM) or generator 70. The output of signal generator 70 can also produce an analog output feeding an SSR.

In one embodiment, the PWM signal generator 70 accepts as inputs the control output 62 and a saw-wave output 82, created by saw-wave generator 80. Generator 80 is correlated to an AC power signal. As later described, PWM signal generator 70 may also be embodied in a microprocessor which serves to digitally create a PWM output signal 72. One of the primary purposes of the pulse-width generator 70 is to send an enable (ON) signal or a disable (OFF) signal to the heater switch 90 only during predetermined intervals.

Figure 4:
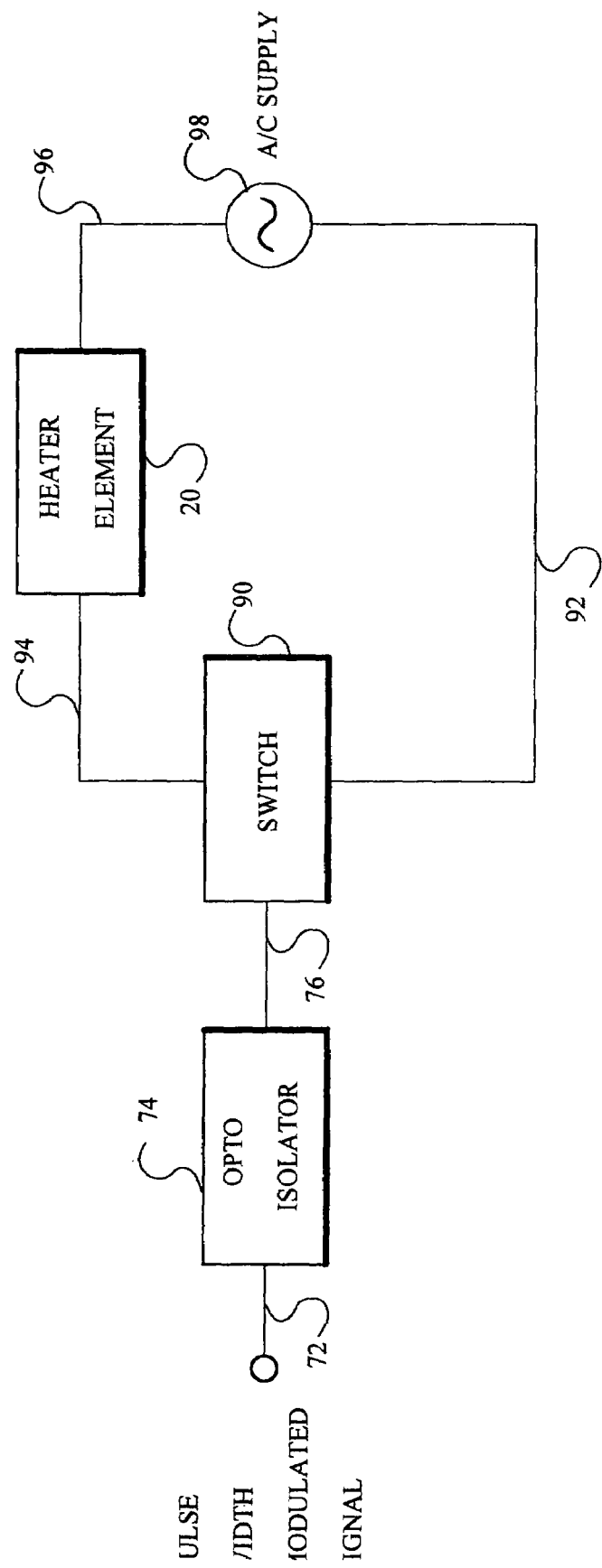
FIG. 4 diagrammatically illustrates a block diagram of the power supply circuit to the heater elements.

In one embodiment, the PWM signal generator 70 modulates the output 72 such that enable (ON) and disable (OFF) signals occur only during the zero crossing of the alternating current power source being supplied to the heater elements. That is, state changes only occur at or near the zero crossing of the alternating current power supply 98 (FIG. 4). This reduces interfering RF signals.

FIG. 4 diagrammatically illustrates a block diagram of the power circuit supplying power to the heater elements 20. In the preferred embodiment, the modulated output 72 is coupled to power switch 90 viz-a-viz opto-isolator 74. Opto-isolator 74 sends the modulated signal 76 to power switch 90. In one embodiment, switch 90 is a triac. However, other components, including other solid state relays and high-speed electro-mechanical relays may also be utilized. The output signal 76 is modulated such that it turns switch 90 ON or OFF during a zero crossing of the alternating current power supply 98. Hence, the power supplied to heater element 20 via circuit branches 92, 94 and 96 may be turned ON or OFF at switch 90 twice per cycle. This is preferred to reduce the noise created by switching the power at times other than at the zero crossing in the alternating current supply 98.

Accordingly, in a typical HVAC system, whether operating to heat air being circulated in the building or to heat fresh-air coming into the HVAC duct system, the fan or blower is typically engaged at or just before the heating elements are engaged. The heater control system 10 may be energized simultaneously or after a slight time delay.

Figure 6:
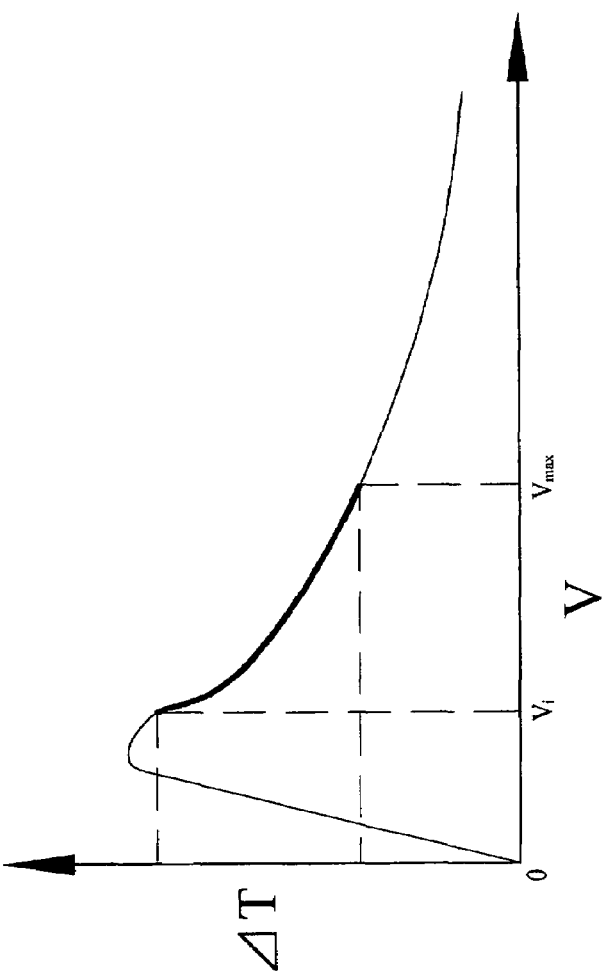
FIG. 6 is a cartesian-plane diagram showing the operative zone for the present control system relative to air velocity and difference in temperature.

The system operates as VAV, variable air volume system wherein the velocity of the air and the temperature of the input air is variable. The present heater control system 10 thus operates when a minimal amount of air begins circulating through the duct 30 represented by $v_i$ in FIG. 6. Assuming the air in duct 30 is at a temperature below a predetermined value, for example, 60 degrees Fahrenheit, meaning the HVAC system demands heat (either viz-a-viz a preset biasing in the control system or an adjustable thermostat which energizes the heater control system 10), air is circulated into inlet 16 in the direction of arrow 14 toward the heating elements 20, 22. The control system 10 may be designed such that power is initially supplied to heating element 20. Initially, the slow moving inlet air traverses thermistor $T_A$, heating elements 20, 22, thermistor $T_B$, and continues downstream to the outlet 18. As the air moves through this path, sensor $T_A$ senses the radiant heat given off by heating elements 20, 22 plus the heat and the ambient temperature of the air. Sensor $T_B$ senses the radiant heat emitted from heating elements 20, 22 and also senses the convection heat of the warmer air, given that the air has absorbed some of the heat generated by the heating elements. The sensors $T_A$, $T_B$ send a signal representative of the sensed heat to difference circuit 50. The difference circuit 50 outputs a difference between the two signals and outputs that difference-signal 52 to control 60. So long as that difference output signal 52 is lower than a predetermined value, and neither of the signals from $T_A$ or $T_B$ are above a predetermined maximum threshold value, the controller 60 sends an enable or ON signal to switch 90 via the PWM generator 70 and opto-isolator 74. Controller 90 utilizes difference-output signal 52 and determines whether that value is below the predetermined value, which, depending upon the circuitry involved, whether digital or analog, varies. The key is that the predetermined value is representative of a particular difference in the heat sensed at $T_A$ and $T_B$. Assuming neither conditioned signals from $T_A$, $T_B$ have reached a maximum threshold value, controller 60 outputs an enable signal 62, causing PWM generator 70 to output a modulated enable signal output 72 to power supply 98. Hence, heater control system 10 of the present invention utilizes the difference in temperature between $T_A$ and $T_B$, which represents air velocity the convection heat absorbed by the air from the heaters, to control the operation of the heaters.

Figure 5:
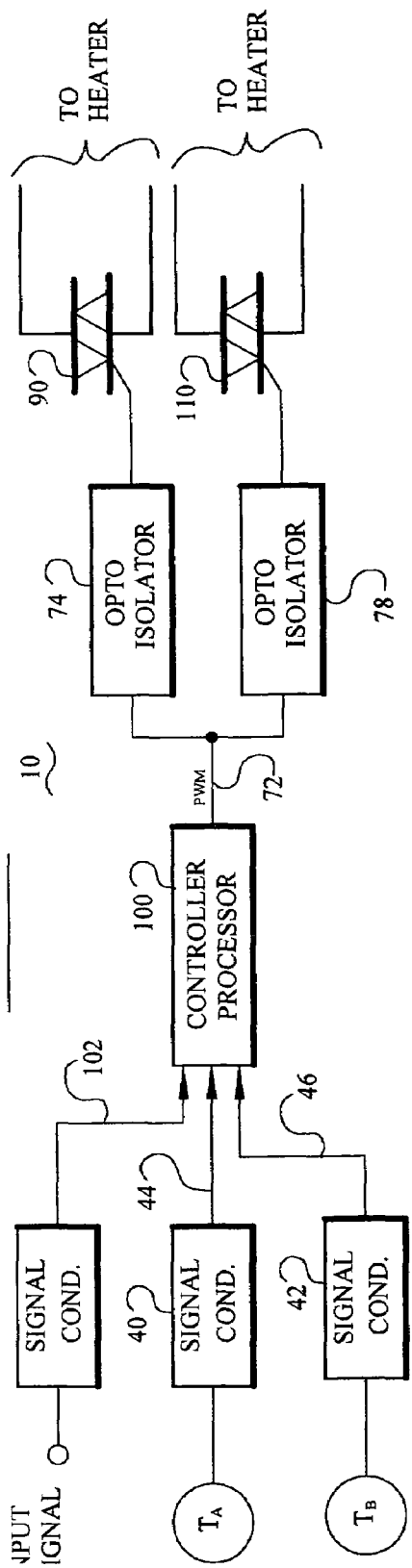
FIG. 5 diagrammatically illustrates a block diagram of a digital embodiment of the heater control system.

FIG. 5 diagrammatically illustrates another embodiment of the heater control system 10 of the present invention. The system performs the same series of steps. However, a controller/microprocessor 100 performs several of the functions illustrated in the block diagram of FIG. 3. The outputs of thermistors $T_A$, $T_B$ are conditioned through signal conditioners 40, 42, respectively. The outputs 44, 46 of the signal conditioners input into controller/microprocessor 100. In addition, processor 100 also receives an input signal 102, which may be a signal from a thermostat or other programmable input to enable the system 10. Input signal 102 may also include a timing signal used to modulate the output from the processor with the power supply to the heaters. The processor 100 takes the input signals 44, 46 from $T_A$, $T_B$, which sensed the heat in the air duct at equidistant upstream and downstream locations relative to the electric heating element, and compares the heat sensed at the equidistant upstream and downstream locations to obtain a difference. Similar to the function of controller 60 in FIG. 3, if the difference is below a predetermined value $T_{Max-Diff}$, and each of the input signals from $T_A$, $T_B$ are also below predetermined maximum threshold values $T_{MTV}$, then the processor/controller 100 digitally creates a pulse-width modulated enable or ON output 72. This output signal 72 is coupled to dual triacs 90, 110 via dual opto-isolators 74, 78, respectively. The triacs 90, 110 switch the power to dual heater elements. the output can also be an analog output compatible with other electronic switching devices which have analog inputs and pulse width modulating outputs with zero voltage switching features.

Controller/processor 100 may be programmed to compare the two input signals $T_A$, $T_B$ to each other and to compare each input signal to a predetermined maximum threshold value $T_{MTV}$ to determine when to send a pulse-wave modulated output signal 72. In addition, the controller 100 could be programmed to output a PWM signal 72 which varies depending upon the amount of heat required to heat the incoming air. For example, a series of operation levels could be established to scale the PWM signal such that the heater elements are energized for longer periods of time when the heat difference values $T_B - T_A$ are smaller and shorter period of time when the heat difference are greater. The following Control Signal Table illustrates possible logic sequences:

Control Signal Table

1. If $T_B - T_A < T_{Max-Diff}$ and if $T_A < T_{MTV}$ and if $T_B < T_{MTV}$, then heater ON
2. If $T_B - T_A < T_{Max-Diff}$, then heater ON, but if
   $T_A > T_{A-MTV}$ then heater OFF (limit control)
   $T_B > T_{B-MTV}$ then heater OFF (limit control)

Additionally, the control system can be configured with programmable logic units and other binary control elements (AND, OR and other types of binary gate or logic subsystems).

Figure 7:
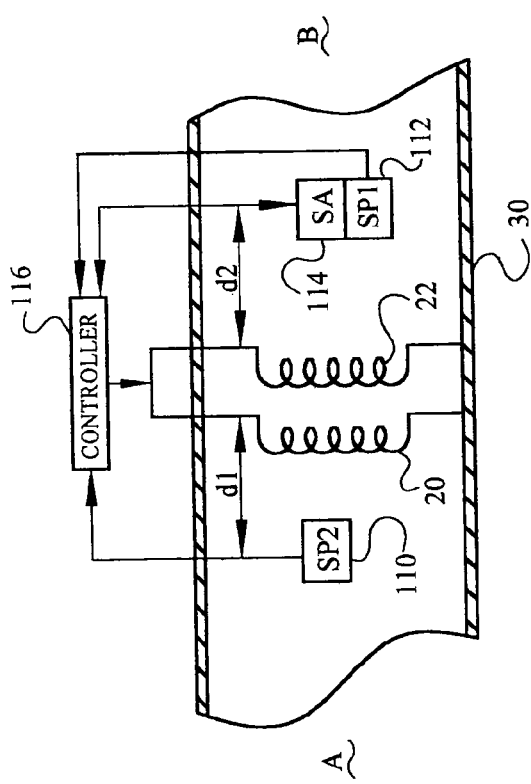
FIG. 7 diagrammatically illustrates another embodiment of the present invention wherein the control system can be programmed to work with air flow from A to B or air flow form B to A, automatically.

FIG. 7 diagrammatically illustrates another embodiment of the heater control system. Duct 30 (part of the HVAC duct system or part of a heater duct sub-system) includes heating elements 20, 22 (a single element may be utilized) which is controlled by controller 116. A passive temperature sensor SP2, designated as sensor 110, is disposed on one side of heating elements 20, 22 and a second passive temperature sensor SP1, designated sensor 112, is mounted on the other side of heating elements 20, 22. An active sensor SA 114 is mounted proximate or adjacent passive sensor 112. Accordingly, passive sensor 110 is mounted a distance d1 away from heating elements 20, 22 and both passive sensor 112 and active sensor 114 are mounted a distance d2 away from heating elements 20, 22. Preferably, d1 equals d2. Controller 116 applies appropriate signals to the active sensor 114 and obtains temperature signals (electronic signals representative of the sensed temperatures) from passive sensor 112 and active sensor 114. Controller 116 utilizes the signals from passive sensors 110, 112 and active sensor 114 to determine when to turn ON electric heaters 20, 22 (via a pulse width modulation control circuit). The prime operation of controller 116 is to determine what is the maximum power or heat or energy which should be utilized as a controller signal to turn ON the pulse width modulator or controller 116 which drives electric heaters 20, 22. Although the formulas set forth below identify power in kilowatts KW, other heat per unit time systems such as BTUs per hour or other heat per unit time or other types of power or energy formulas (using something other than KW) could be utilized. In other words, by modifying the formulas set forth below to refer to heat in BTU or power in watts, joules or horsepower, the same control of heater 20, 22 can be achieved. Passive sensors 110, 112 are typically RTDs or diode sensors but other temperature sensing devices could be utilized. Active sensor 114 is any type of thermal anometer typically called in the industry a hot wire system sensor. For example, a resistive temperature detector RTD may be utilized. The following equations are used in one embodiment. Please note that KW in some equations may be KW per square foot.

$$KW = (1/3160)(VEL)(TempDownStream - TempUpStream) \quad \text{Eq. A}$$

where VEL is an air velocity factor (note: KW may be KW per square foot)

$$KW = (1/3160)(VEL)(TempDownFixed - TempUpStream) \quad \text{Eq. B}$$

Velocity Formula . . . $VEL = f(SA, SP1)$   Eq. C where SA and SP1 are equidistant from heater and are both either upstream or downstream from heater and f (SA, SP1) is a function with a resultant based upon temperature inputs SA and SP1.

With respect to equation C, persons of ordinary skill in the art have knowledge of the type of function f (SA, SP1) which is utilized to determine the air velocity. Since passive sensor 112 is proximate active sensor SA 114, and since the output of the passive sensor 112 compensates for ambient temperature in duct 30, the radiant heat component from the velocity formula VEL is compensated. In other words, the radiant heat striking passive sensor 112 is identical to the radiant heat striking active sensor SA 114 because both sensors are located a distance d2 away from heat elements 20, 22. Controller 116, with respect to equation A, senses the temperature upstream and the temperature downstream essentially using passive sensors 110, 112. In order to determine which is the downstream temperature, controller 116 may be programmed to determine whether the ambient temperature is lower at region A (near passive sensor 110) as compared with region B (near passive sensor 112). Therefore, controller 116 can determine whether air flow occurs (i) from position A to position B and designate or assign passive sensor 110 the upstream and passive sensor 112 the downstream sensor; or (ii) from region B to region A (right to left in FIG. 7) by determining the temperature at passive sensor 112 is lower than the temperature at passive sensor 110 and designate sensor 112 as the upstream sensor and sensor 110 as the downstream sensor.

With respect to control equations A, B, G and H, the output of the control formula is limited such that the resultant (KW, typically kilowatts per square foot) from these equations is no greater than a predetermined set maximum value normally determined by a design engineer. This maximum value is based upon expected lowest upstream temperatures and duct air velocity and duct size (cross-sectional, typically) and expected downstream temperatures and represents the maximum safe level to run the heater. Equation A generates an ON signal when the resultant KW is less than a predetermined value and wherein the resultant is based upon the temperature differential and air velocity. The control system in equation B uses a fixed or preset value (a predetermined value) for the downstream temperature (TempDownFixed) thereby eliminating the necessity to measure the downstream temperature. This control algorithm is operable because the control system turns ON the heater (via the pulse modulation circuit) when the resultant power KW is less than a predetermined critical value. Below the critical value, the controller 116 activates ON electric heaters 20, 22 (through intermediate control sub-system of the pulse width modulator). Therefore, if controller 116 "fixes" the downstream temperature at a maximum amount (TempDownFixed), this fixed value limits the resultant KW of Equation B to a maximum amount, and this control algorithm effectively establishes an upper maximum limit for the temperature differential (TempDownFixed − TempUpStream) based upon the upstream temperature. However, there is no lower limit to the upstream temperature (TempUpStream). Further, when the upstream temperature is negative (the equations herein utilize temperature in Fahrenheit F), the difference between the downstream temperature and the upstream temperature is simply a greater value (for example, if TempUpStream is −10 degrees, and TempDownFixed is 40 degrees, the differential is "50," however if the TempUpStream is +10, the differential is "30"). This greater value (a negative TempUpStream) causes the resultant of the control equations (equation A, B, G and H) to be greater. However, the resultant KW of the control equations is subject to a maximum value (a predetermined value) which is based upon design parameters of delta T and air or cross-sectional size of duct and air velocity. The constant in equations A, B, G and H is based, at least in part, on the conversion factor 1 KW=3412 BTUs/HR. Therefore, the control algorithms could be modified for other units of power, heat or energy.

The controller also is programmed to include a calculation based upon the square footage (cross-section) of duct 30 as a preset point or number (a predetermined value). The controller will compute the maximum KW per square foot under various conditions of air velocity and ambient temperature in the duct based up the equations. The ambient temperature is generally obtained by the upstream sensor. If the calculated KW per square foot from control equations is smaller than the preset KW per square foot (the maximum KW for the HVAC system), then the controller 116 sends a signal to the power relays (in one embodiment, solid state relays or SSRs) to increase or decrease the output to heaters 20, 22 as per the following equation: kilowatt per square foot calculated by the control equations divided by preset kilowatt per square foot maximum equals a percentage of maximum output. The percentage of maximum output signal is used to drive the SSRs and turn ON the heaters (via the pulse width modulators).

The objective of the control equations is to modulate electric heaters 20, 22 by using inputs of air velocity and ambient temperature and the maximum allowed temperature downstream of the heater. The thermal anemometer, compensated by the passive sensor 112 proximal thereto, can be located downstream or upstream of electric heaters 20, 22. Preferably, but not necessarily, passive sensor 110 is the same distance d1 as passive sensor 112, distance d2 from electric heaters 20, 22. However, as discussed below in conjunction with Equations F, G and H, the radiant heat component or factor can be compensated prior to obtaining the differential temperature from the measured temperature.

Figure 8B:
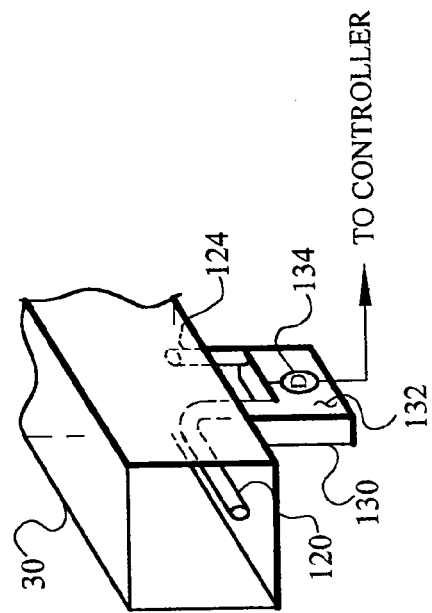
FIGS. 8A and 8B diagrammatically illustrate two velocity sensors configured as a differential pressure sensor subsystems, measuring air velocity as a pressure differential.
Figure 8A:
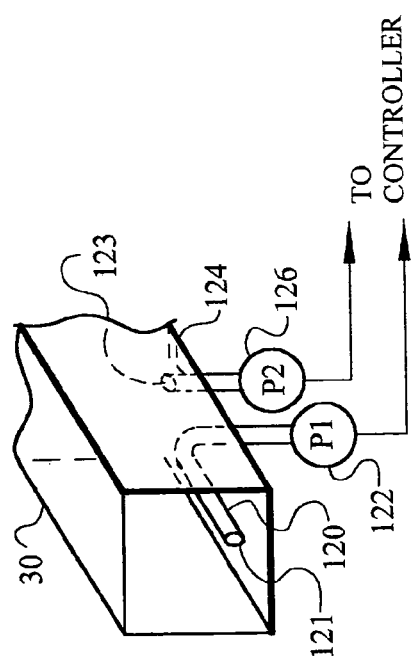

Rather than utilize a thermal anemometer (typically an RTD), the system may utilize a pressure differential subsystem to determine air velocity. FIGS. 8A and 8B diagrammatically show the differential pressure system. In FIG. 8A, total pressure in duct 30 is measured with tube 120 having inlet 121 facing upstream. A pressure sensing device P1, sensor 122, develops a signal, which is sent to the controller, representative of the total pressure in duct 30. A second tube 124, having inlet 123 which is normal or perpendicular to the air flow through duct 30, is coupled and in communication with pressure sensor P2, sensor 126. Sensor P2 measures the static pressure in duct 30. The difference between the total pressure P1 and the static pressure P2 provides an indication of velocity pressure in psi or water gauge. Persons of ordinary skill in the art know that the air velocity can be obtained based upon this pressure differential and the air velocity calculation is primarily dependent upon the square root of the difference between P1 and P2.

$P1-P2$=velocity pressure (psi or water gauge)     Eq. D $VEL$=air velocity=(constant)(square root of $(P1-P2)$)     Eq. E FIG. 8b shows that conduit sub-system 120 leads to a containment sub-system 130 having an internal chamber 132. Conduit 124 is in communication with the other side of chamber 132. A pressure differential sensor D, sensor 134, measures the differential pressure in pressure chamber 132.

One feature of the present invention is the placement of passive sensor 112 and active sensor SA 114 equidistant d2 from heaters 20, 22. Hence, the radiant heat from heaters 20, 22 is compensated for by utilizing the outputs from passive sensor 112 and active sensor SA 114.

In addition, radiant heat can be calculated based upon the kilowatt output from heater elements 20, 22. Further, the radiant heat at various distances d1, d2, from the heater elements 20, 22 can be mathematically calculated if the controller determines actual kilowatts of power generated by heaters 20, 22. In a sense, this is a negative feedback system which compensates for radiant heat by computing the heat power given off by the heaters. Equation F, G and H which follow first determine the radiant heat component RAD from heaters 20, 22 striking either or both of the sensor systems 110, 112, 114 and thereafter deduct or compensate the sensed temperatures by discounting the radiant heat component from those sensed temperature signals.

$RAD$=(a constant)$f(KW,d)$     Eq. F where a=constant and $f(KW, d)$ is a function with a resultant based upon the energy KW generated the heating element and accounting for distance d, the distance of the sensor from the heating element $KW=(1/3160)(VEL)((\text{TempDownStream}-\text{RAD-down})-(\text{TempUpStream}-\text{RADup}))$     Eq. G where RADdown uses the distance downstream and RADup uses the distance upstream between the heaters and the respective sensors $KW=(1/3160)(VEL)((\text{TempDownFixed}-(\text{TempUpStream}-\text{RADup}))$     Eq. H Persons of ordinary skill in the art know how to compute the radiant heat from a "hot body." The radiant heat decreases inversely proportional to the square of the distance d1 or d2 of the sensor away from the heater element. Hence, the negative feedback control system determines the amount of kilowatts or heat generated by heating elements 20, 22, computes the radiant heat component for each of the particular temperature sensors and, in either equation G or H, subtracts the radiant heat component from the downstream temperature and the upstream temperature (Eq. G) or the radiant heat component only from the upstream temperature as noted in equation H. In this manner, it may not be necessary to have the upstream temperature sensor equidistant from the heat element as compared with the downstream temperature sensor. The radiant heat component is deducted from the sensed heat value or values.

The currently preferred embodiment utilizes two sensors spaced equidistant from the heater elements, see, for example, FIG. 1 and sensors Ta and Tb. In this embodiment, sensors Ta and Tb are passive sensors. In an initial state, that is, at start-up or at other initial time points, the controller 100 (FIG. 5) or 116 (FIG. 7) must determine the initial velocity in the duct. To do this, the controller is pre-programmed or pre-set to use the "KW rating of the heater," which is the heat or load factor of the heater established by the designer of the particular HVAC system deployed in the building or structure. This is the preferred maximum heat or load factor of the heater in the duct. This heater rating is converted into KW per square foot of duct area (a cross-sectional area) and the design factor is identified herein as "Kwdesign."

At time zero (Step 1) (after a heat ON signal from the global building control signal), the heater elements are switched ON for 1 or 2 seconds at a low power (for example, 20% KW design) to determine or test whether there is any air movement or air velocity and to determine air direction. The delta T or Tb−Ta determines any air velocity and its direction, if delta T is not zero. The short pulse of low power does not significantly raise air temperature but provides enough information to detect air movement. If Ta=Tb, then continue this "sleep mode."

Step 2: If delta T is not zero, the system sends an initial pulse of sufficient duration (5 or 10 or 20 seconds) and of a known power (typically, a low power) to the heater elements and obtains the TempDownStream and TempUpStream readings from the passive sensors equidistant from the heater elements. The initial power pulse (a nominal power pulse) may be 20% of full power. This power pulse duration and known power level is sufficient to bring Ta, Tb to steady states. This variable data from Tb and Ta, TempDownStream and TempUpStream, is applied to the following control equation and the air velocity VEL in the duct is computed:

$$KWdesign(0.20) = (1/3160)(VEL)(TempDownStream-TempUpStream) \quad \text{Eq. I}$$

where VEL is the variable to be calculated as the air velocity factor

Other power percentages, other than 20%, may be used. The key, in this step, is to activate the sensors to a stable point with a known power pulse of sufficient duration. If there is air flow or velocity in the duct, there is a difference between the signals from Ta and Tb. If there is no air movement (Step 1), Ta and Tb signals are the same and the system repeats Step 1. If TempDownStream−TempUpStream is ZERO, the control system waits a predetermined time period, for example about 30 seconds, and then repeats Step 1. This is a "sleep" mode were the heater control senses air velocity in the duct in Step 1. If there is a temperature difference TempDownStream−TempUpStream detected by Ta and Tb signals (Step 2), then the control system executes Step 2 and computes VEL and uses VEL velocity from Eq. I.

Step 3 uses a temperature set point "Tset" which, in the current embodiment, is the maximum profile temperature for the duct (not to be confused with the maximum shut-off temperature for the entire heater system (which is a safety maximum temperature)). The set point temperature is, in the current embodiment, set at the factory or by the installer in the controller upon installation of the heater system. Another designation of the set temperature Tset is a maximum control point temperature, which is generally less than (but not necessarily less than) the shut-off temperature of the system. The set temperature Tset is, theoretically, a pre-set temperature that includes both convection and radiant heat components. Alternatively, the set point temperature can be programmed into the controller as needed by the installer or the operator seeking to re-set or operate the heater system. In addition to the foregoing, the controller can determine the direction of air flow or velocity in Step 1 based upon which sensor Ta or Tb obtains a lower temperature (indicative of an upstream temperature).

Step 3 calculates the desired power "KWcontrol" based upon the following formula:

$$KWcontrol = (1/3160)(VEL)(Tset-TempUpStream). \quad \text{Eq. J}$$

Step 4 takes the ratio of KW control to KWdesign (that is, KWcontrol/KWdesign), and applies that control ratio signal as a pulse width modulated signal to the solid state relays (SSRs) or triac or other switching devices. As it relates to FIG. 5, controller 100 first calculates air velocity VEL by using the design power KWdesign, or a percentage thereof; and then uses the set point temperature Tset and the signal from Ta and the previously calculated velocity VEL to determine Kwcontrol; and, based thereon, the duration of the pulse width modulated PWM signal which is Kwcontrol/KWdesign. This control system accounts for variable input air temperature and variable velocity.

Step 5 determines whether TempDownStream or Tb is 2 degrees F. above or 2 degrees F. below (+/−2 degrees) the set point temperature Tset. If YES, the controller continues to apply the previous KWcontrol signal. Of course, other temperature ranges could be used other than 2 degrees F. Preferably, the temperature Tb (TempDownStream) is obtained by the appropriate sensor continuously which is more or less about once per second. If the temperature differential Tb compared to Tset is greater than 5 degrees F., the controller re-calculates the air velocity VEL with Eq. K (hereinbelow) and then re-calculates the KWcontrol with Eq. J. For temperature ranges between +/−2 and +/−5 (Tb compared to Tset), some type of integration or slope function can be used to increase (for positive differences) or decrease (for negative differences) the KWcontrol.

$$KWactual = (1/3160)(VEL)(TempDownStream-TempUpStream) \quad \text{Eq. K}$$

where KWactual is the last power control signal, ultimately subsequently proportionally applied to the heater elements, and VEL is the air velocity to be calculated (note: KWactual is KW per square foot)

Step 6: The controller continues to drive the heater elements with Eq. J to keep the temperature difference Tb compared to Tset +/−2 degrees F. and, by sensing the temperature differential Tset and TempDownStream (Tb), effectively continuously monitors air velocity. If the temperature differential Tset and TempDownStream (Tb) exceeds the +/−5 degrees F. range (or another pre-set range), the controller re-calculates air velocity with Eq. K because something has changed (air velocity or input air temperature).

Step 7: At a very low or nominal velocity (less than a certain cubic flow per minute, for example 1–5% of the normal design velocity of the duct system), as velocity is determined by Eq. K, the controller turns the system into a "sleep" mode. This is a step function which turns the system to the sleep mode with heater power OFF to detect very low velocity. In the sleep mode, the system executes Step 1 and continually tests for air velocity.

As an alternative to the control routine described above, the system may be programmed to re-calculate or re-determine the velocity VEL of the air in the duct (Eq. K) based upon various trigger control points. One trigger point may be time, for example, measure VEL once per second (or other predetermined time period), since the controller 100 obtains TempUpStream and TempDownStream somewhat continuously. Another trigger point may be the temperature differential TempDownStream minus TempUpStream. A third trigger point may include a relationship between TempDownStream and Tset. The alternative control routines discussed below use these trigger control points.

Alternate Step 5 (Step 5alt) determines whether the trigger control point condition has been reached. The condition is time, in one embodiment, or a temperature differential outside a predetermined range, for example TempDownStream minus TempUpStream in excess of +/−5 degrees F. If the trigger control point condition is not met, the controller continues to apply the previous KWcontrol signal (or a portion thereof, as a proportional signal to KWdesign). Of course, other temperature ranges could be used other than 5 degrees F. If the trigger control point is met (a lapse of time or a temperature differential greater than a pre-set boundary), the controller re-calculates the air velocity VEL with Eq. K using the last power setting KWactual and then uses the new VEL and re-calculates the KWcontrol with Eq. J.

Alternate Step 6 (Step 6alt): The controller continues to drive the heater elements with Eq. J as long as the trigger control point is not reached. If the trigger control point is noted by the controller, the controller recalculates air velocity with Eq. K because something has changed (air velocity or input air temperature).

Alternate Step 7 (Step 7alt): At a very low or nominal velocity (less than a certain cubic flow per minute, for example 1–5% of the normal design velocity of the duct system), as velocity is determined by Eq. K, the controller goes into a "sleep" mode. This velocity monitoring step is a step function which turns the system to the sleep mode with heater power KWcontrol OFF to detect very low velocity. In the sleep mode, the system executes Step 1 and continually tests for air velocity.

In all the aforementioned control systems, the system is controlled by a global or system wide ON/OFF signal generated by a room sensor or some other type of control system that is independent of the automatic heater control described herein. In a global OFF state, no steps 1–7 are executed. At the initiation of a global ON signal, Step 1 is executed until Step 5 (or Step 5alt), temperature with +/−2 degrees F. of Tset compared with Tb (TempDownStream) or other trigger control point, is achieved. The controller automatically balances the KWcontrol to keep within this temperature control range or within the trigger control point boundaries. Outside the temperature control range (delta T outside +/−5 in Step 5 or outside the trigger control point in Step 5alt), velocity is sensed and the system stays on automatic control (Eq. J) until the system is within the trigger control point boundary. If a low velocity is sensed (Eq. K), the system goes into a sleep mode and periodically tests for air velocity. In the presence of a global OFF signal, the heater control turns OFF the heater at that global command. In this manner, the controller automatically controls the heaters based upon both input or ambient air temperature and air velocity, while discounting radiant heat in the KWcontrol signal. Radiant heat is discounted in the velocity calculation. The two prime variables are air velocity and ambient or upstream temperature. The present controller primarily sets the control for the heater based upon air velocity which discounts radiant heat. Further the radiant heat factor can be discounted in the Tset and TempUpStream. Therefore the difference Tset compared to TempUpStream (see Eq. J) also discounts radiant heat.

The claims appended hereto are meant to cover modifications and changes within the scope and spirit of the present invention.

What is claimed is:

1. A forced-air heater control system for an electric heater having at least one electric heating element disposed within an air duct carrying forced air from an upstream position to a downstream position, said at least one electric heating element supplied with electrical power via a power control switch, the control system comprising:
   a first temperature sensor and second temperature sensor respectively disposed upstream and downstream of, and spaced equidistant from and close enough to sense radiant heat from, said at least one heating element, each said temperature sensor producing an output therefrom;
   a control signal generator accepting said temperature sensor outputs and outputting a power ON signal to said power control switch when the difference between said temperature sensor outputs is below a predetermined value, said power control switch controlling said at least one electric heating element in said forced-air heater control system.

2. A forced-air heater control system as claimed in claim 1 wherein said first and second temperature sensor are first and second thermistors which are spaced from said at least one heating element such that said thermistors are capable of sensing the radiant heat from said at least one heating element.

3. A forced-air heater control system as claimed in claim 1 wherein said control signal generator includes a means for outputting a power OFF signal to said power control switch when either one of said first and second temperature sensor outputs reaches a predetermined maximum value.

4. A forced-air heater control system as claimed in claim 3 wherein said means for outputting a power OFF signal includes one of a digital means and an analog means.

5. A forced-air heater control system as claimed in claim 1 wherein said control signal generator includes means for generating a pulse width modulated signal to generate said power ON signal when the difference between said temperature sensor outputs is below a predetermined value.

6. A forced-air heater control system as claimed in claim 5 wherein said means for generating a pulse width modulated signal includes one of a digital means, binary means and an analog means.

7. A forced-air heater control system as claimed in claim 1 wherein said control signal generator includes means for generating a pulse width modulated signal to generate said power ON signal when the difference between said temperature sensor outputs is below a predetermined value, wherein said electrical power supplied to said at least one electric heating element is an alternating current power supply, and said pulse width modulated signal is correlated to said alternating current power supply.

8. A forced-air heater control system as claimed in claim 1 wherein said control signal generator includes means for generating a pulse width modulated signal to generate said power ON signal when the difference between said thermistor outputs is below a predetermined value, wherein said electrical power supplied to said at least one electric heating element is a DC power supply, and said pulse width modulated signal controls said DC power supplied to said at least one heating element.

9. A forced-air heater control system as claimed in claim 1 wherein said control signal generator is coupled to said power control switch of said at least one electric heating element via at least one opto-isolator.

10. A forced-air heater control system as claimed in claim 1 wherein said power switch is a triac or solid state relay (SSR).

11. A forced-air heater control system for an electric heater having at least one electric heating element disposed within an air duct carrying forced air from an upstream position to a downstream position, said at least one electric heating element supplied with electrical power via a power control switch, the control system comprising:
   an upstream temperature sensor and a downstream temperature sensor, said upstream and downstream temperature sensor being a thermistor or a resistive temperature detector (RTD), said respective temperature sensors being disposed equidistant from said at least one electric heating element within said duct and close enough to sense radiant heat from said heating element, and each said temperature sensor having a respective electrical output;

a control circuit accepting as inputs said respective electrical outputs of said temperature sensors, said control circuit including means for obtaining a difference between the output of said upstream temperature sensor and the output of said downstream temperature sensor, said control circuit generating a difference signal which represents convection heat sensed by said downstream temperature sensor, said control circuit including means for generating a pulse width modulated signal based upon said difference signal;

a communicative coupling between said control circuit and said power control switch such that said pulse width modulated signal controls are applied to said electrical power supplying power to said at least one electric heating element, said power control switch controlling said at least one electric heating element in said forced-air heater control system.

12. A forced-air heater control system as claimed in claim 11 wherein said communicative coupling is an opto-isolator.

13. A forced-air heater control system as claimed in claim 11 wherein said power control switch is a triac or solid state relay.

14. A method of controlling a forced-air heater system having at least one heating element disposed within an air duct carrying forced air from an upstream position to a downstream position, said at least one electric heating element supplied with electrical power via a power control switch, the method comprising:

sensing the heat in the air duct at equidistant upstream and downstream locations relative to said at least one electric heating element, said sensing including radiant heat sensing from said heating element;

comparing the heat sensed at said equidistant upstream and downstream locations to obtain a difference signal; and enabling said power control switch to supply said electrical power when said difference signal is below a predetermined value, wherein said power control switch controls said at least one electric heating element in said forced-air heater control system.

15. The method of claim 14 wherein said enabling step includes the step of generating a pulse width modulated signal based upon said difference signal.

16. The method of claim 14 wherein said comparing step includes the step of comparing said heat sensed at said equidistant upstream and downstream locations to a maximum threshold value, respectively, and disabling said power control switch if either of said heat sensed exceeds said value.

* * * * *